Aug. 11, 1925.
H. HARFORD
TIRE CHAIN
Filed April 14, 1925
1,549,360
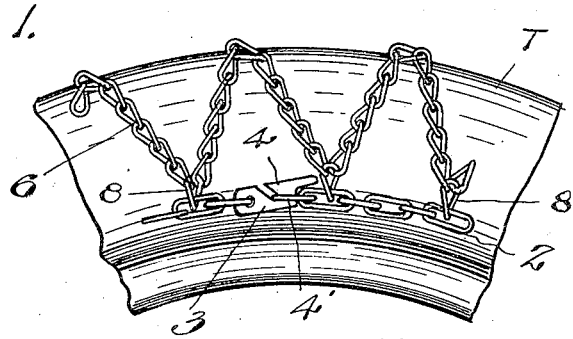
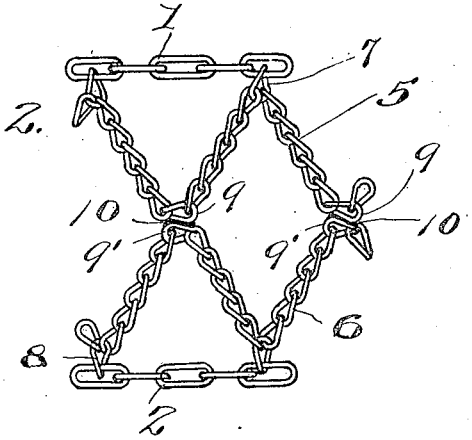
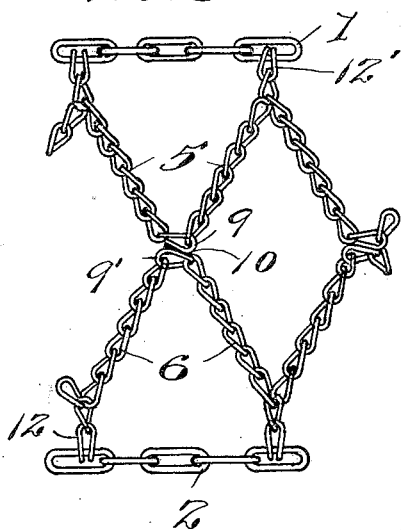
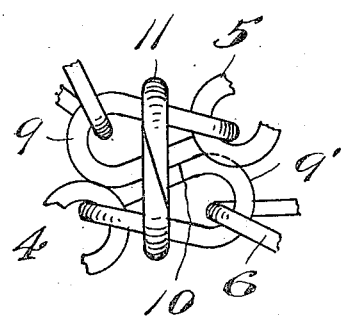
Inventor
Harry Harford
By Herbert E. Smith
Attorney Patented Aug. 11, 1925.

1,549,360

UNITED STATES PATENT OFFICE.

HARRY HARFORD, OF LEWISTON, IDAHO, ASSIGNOR TO HARFORD DIAMOND CHAIN COMPANY, OF LEWISTON, IDAHO, A CORPORATION.

TIRE CHAIN.

Application filed April 14, 1925. Serial No. 23,041.

*To all whom it may concern:*

Be it known that I, HARRY HARFORD, a citizen of the United States, residing at Lewiston, in Nez Perce County, and State of Idaho, have invented certain new and useful Improvements in Tire Chains, of which the following is a specification.

My present invention relates to improvements in tire chains for vehicle wheels for use as anti-skidding devices designed to prevent lateral skidding or sliding of an automotive vehicle, and also to assure ample frictional engagement of the rotating wheel for tractive power.

The chain is simple in construction and composed of a minimum number of parts rendering it possible to produce the device at a comparatively inexpensive price or cost of production, and because of its simplicity it may with facility be applied to a wheel tire for use and with equal facility detached therefrom when not required.

The anti-skidding formation of the tire chain is of the well known diamond shape, and the invention consists in certain novel features of construction and combinations and arrangements of parts including a pair of circumferential side chains and a pair of anti-skidding chains supported from the side chains, as will hereinafter be more fully set forth and claimed.

In the accompanying drawings I have illustrated several examples of the physical embodiment of my invention wherein the parts are combined and arranged according to modes I have so far devised for the practical application of the principles of my invention.

Figure 1 is a view in side elevation of a portion of a wheel-tire showing part of the tire chain thereon.

Figure 2 is a plan view showing a portion of the tire chain.

Figure 3 is a plan view similar to Fig. 2 with a slightly modified form of fastening the anti-skid chains to the side chains.

Figure 4 is an enlarged detail view showing a modified form of joint or fastening between the pair of anti-skid chains.

In Figure 1 of the drawings I have indicated a portion of a wheel tire as T and the relative arrangement of the tire chain is indicated on the portion of the tire.

The tire chain as a whole comprises a pair of circumferential side chains 1 and 2 of less diameter than the maximum or tread diameter of the tire in order that they may retain the tire-chain in position on the tire with the anti-skid portion extending over the tread of the tire.

At their ends the side chains are adapted to be detachably fastened together as by means of a fastening link 3 carried at one end of the side chain and fashioned with a hook 4 adapted to engage the link 4' at the other end of the side chain. Each side chain has a fastening link in order that either one or both of the side chains may be loosened in putting on or taking off the tire-chain.

Between the two-side chains I arrange a pair of anti-skid chains 5 and 6 which when applied to the tire form diamond shapes extending across the tread of the tire to prevent lateral skidding or rotary slipping of the wheel to which the chain is applied.

The chains 5 and 6 are continuous and endless but they are arranged each in zig-zag manner around the tire and connected together and to the complementary side chains.

For connecting the chains 5 and 6 to the side chains I employ spaced links 7 and 8 of the respective chains 5 and 6 which links after first being opened are then closed over links of the side chains to securely connect the four chains. The anti-skid chains 5 and 6 thus form triangular spaces with the side chains, and the anti-skid chains, which are fastened together at regular intervals around the median line of the tire tread, form diamond shaped spaces as indicated in Figures 2 and 3.

The anti-skid chains 5 and 6 are fastened together by welding complementary links as 9 and 9' at the joint 10, said links being disposed laterally of the median line of the tire and joined at their adjacent sides in order that no protruding parts may be formed, and to insure regular diagonally extending and intersecting lines or portions of the chains across the tire tread.

This zig-zag formation of the anti-skid chains permits the ready adjustment of the side chains on the tire in spite of the fact that the side chains are of smaller diameter than the maximum tread diameter of the anti-skid chains, in order that the ends of the side chains may be attached, or detached in assembling or removing the tire chain with relation to the tire.

In Figure 4 an additional auxiliary means is shown for fastening together the anti-skid chains at the median line of the tread. This auxiliary means comprises a link 11, which when open is passed around the adjoining links 9 and 9' whether these links are welded or not. When the link 11 is closed in suitable manner it may, if desired, be welded to the two enclosed links 9 and 9'.

In Figure 3 the chains 5 and 6 are provided at regular intervals with special hooked links 12 and 12' that are clamped to links of the respective side chains to retain the anti-skid chains in position.

Having thus fully described my invention what I claim as new and desire to secure by Letters Patent is—

1. The combination with a pair of detachable side chains, of a pair of anti-skid chains each arranged in zig-zag formation means for fastening said anti-skid chains to the side chains and welded joints between laterally disposed adjacent links of the anti-skid chains.

2. The combination with a pair of detachable side chains, of a pair of anti-skid chains each arranged in complementary zig-zag formation, said anti-skid chains having spaced fastening means on the side chains, welded joints between laterally disposed adjacent links of the anti-skid chains, and an auxiliary wear link enclosing said welded links.

In testimony whereof I affix my signature.

HARRY HARFORD.